(12) United States Patent
Park et al.

(10) Patent No.: US 10,844,207 B2
(45) Date of Patent: Nov. 24, 2020

(54) THERMOPLASTIC ELASTOMER COMPOSITION HAVING ADVANCED VIBRATION ISOLATION AND THERMAL RESISTANCE, AND MOLDED ARTICLE MANUFACTURED THEREFROM

(71) Applicant: LOTTE CHEMICAL CORPORATION, Seoul (KR)

(72) Inventors: Seung Bin Park, Daejeon (KR); Chan Jun Kim, Daejeon (KR); In Woo Kim, Daejeon (KR); Cheon Min Park, Daejeon (KR)

(73) Assignee: LOTTE CHEMICAL CORPORATION, Seoul (KR)

( * ) Notice: Subject to any disclaimer, the term of this patent is extended or adjusted under 35 U.S.C. 154(b) by 630 days.

(21) Appl. No.: 15/320,846

(22) PCT Filed: Jun. 24, 2015

(86) PCT No.: PCT/KR2015/006436
§ 371 (c)(1),
(2) Date: Dec. 21, 2016

(87) PCT Pub. No.: WO2015/199443
PCT Pub. Date: Dec. 30, 2015

(65) Prior Publication Data
US 2017/0198127 A1    Jul. 13, 2017

(30) Foreign Application Priority Data
Jun. 26, 2014  (KR) .................. 10-2014-0078942

(51) Int. Cl.
| | | |
|---|---|---|
| *C08L 23/16* | (2006.01) | |
| *C08L 23/12* | (2006.01) | |
| *C08L 53/00* | (2006.01) | |
| *C08L 21/00* | (2006.01) | |
| *C08K 3/34* | (2006.01) | |
| *C08L 53/02* | (2006.01) | |

(52) U.S. Cl.
CPC ............... *C08L 23/16* (2013.01); *C08K 3/34* (2013.01); *C08L 21/00* (2013.01); *C08L 23/12* (2013.01); *C08L 53/00* (2013.01); *C08L 53/02* (2013.01); *C08L 2201/08* (2013.01); *C08L 2205/03* (2013.01); *C08L 2207/04* (2013.01); *C08L 2312/00* (2013.01)

(58) Field of Classification Search
CPC .......... C08L 23/16; C08L 21/00; C08L 23/12; C08L 53/00; C08L 53/02; C08L 2201/08; C08L 2205/03; C08L 2207/04; C08L 2312/00; C08K 3/34

USPC ........................................................ 524/451
See application file for complete search history.

(56) References Cited

U.S. PATENT DOCUMENTS

| | | |
|---|---|---|
| 2004/0010083 A1 | 1/2004 | Jeong |
| 2007/0184969 A1 | 8/2007 | Dubois |
| 2007/0249743 A1 | 10/2007 | Sehanobish |
| 2007/0265364 A1 | 11/2007 | Oner-Deliomanli |
| 2008/0071029 A1 | 3/2008 | Ono |
| 2009/0298994 A1 | 12/2009 | Dubois |

FOREIGN PATENT DOCUMENTS

| | | |
|---|---|---|
| CN | 101550257 | 10/2009 |
| CN | 103012952 | 4/2013 |
| EP | 1201710 | 5/2002 |
| EP | 1564247 | 8/2005 |
| EP | 1871816 | 2/2014 |
| JP | 07-053842 | 2/1995 |
| JP | 08-176394 | 7/1996 |
| JP | 2007-204676 | 8/2007 |
| JP | 2008-308516 | 12/2008 |
| JP | 2008-543978 | 12/2008 |
| JP | 2009-511662 | 3/2009 |
| KR | 10-2001-0075894 | 8/2001 |
| KR | 10-2004-0006124 | 1/2004 |
| KR | 10-2006-0056981 | 5/2006 |
| KR | 10-0828620 | 5/2008 |
| KR | 10-2008-0069364 | 7/2008 |
| KR | 20080069364 A * | 7/2008 |
| KR | 10-2009-0020563 | 2/2009 |
| KR | 10-2010-0025211 | 3/2010 |

(Continued)

OTHER PUBLICATIONS

KR 10-1350890 B1—machine translation (Year: 2014).*

(Continued)

*Primary Examiner* — Ronald Grinsted
(74) *Attorney, Agent, or Firm* — Lex IP Meister, PLLC

(57) ABSTRACT

The present invention relates to a thermoplastic elastomer composition and a molded article manufactured therefrom. The thermoplastic elastomer composition according to the present invention has advanced vibration insulation and thermal resistance. Thus, the thermoplastic elastomer composition may exhibit excellent vibration insulation in the vibration frequency area that a human can feel, and may exhibit excellent mechanical properties even if exposed to a high temperature environment for a long time. A molded article manufactured using such a thermoplastic elastomer composition may be suitably used in various fields such as various daily supplies, medical supplies, parts for an automobile, interior and exterior materials for an automobile, interior and exterior materials for a building, and the like.

10 Claims, No Drawings

(56) References Cited

FOREIGN PATENT DOCUMENTS

| | | | |
|---|---|---|---|
| KR | 10-2010-0029799 | 3/2010 | |
| KR | 10-2011-0137568 | 12/2011 | |
| KR | 10-2011-0139997 | 12/2011 | |
| KR | 10-1180874 | 9/2012 | |
| KR | 10-2012-0117131 | 10/2012 | |
| KR | 10-1350890 | 1/2014 | |
| KR | 101350890 B1 * | 1/2014 | |
| WO | WO-2006102154 A2 * | 9/2006 | ............ C08F 210/16 |
| WO | 2011-159059 | 12/2011 | |

OTHER PUBLICATIONS

Dow—White paper—"Blow Molding TPOs with High Melt Strength Polyolefin Elastomers" (http://msdssearch.dow.com/PublishedLiteratureDOWCOM/dh_0067/0901b8038006711e.pdf?filepath=elastomers/pdfs/noreg/774-01401&fromPage=GetDoc). Online—Oct. 2, 2006 (Year: 2006).*

Reincke et al. ( KGK Oct. 2009—"Influence of Process Oils on the Mechanical Properties of Elastomers", https://www.kgk-rubberpoint.de, Online Sep. 17, 2009) (Year: 2009).*

KR 20080069364 A—machine translation (Year: 2008).*

EPO, Extended European Search Report of EP 15812659.9 dated Nov. 22, 2017.

PCT Search Report & Written Opinion, Patent Cooperation Treaty, dated Jul. 27, 2015, Application No. PCT/KR2015/006436.

* cited by examiner

THERMOPLASTIC ELASTOMER COMPOSITION HAVING ADVANCED VIBRATION ISOLATION AND THERMAL RESISTANCE, AND MOLDED ARTICLE MANUFACTURED THEREFROM

CROSS-REFERENCE TO RELATED APPLICATION

This application claims the benefit of Korean Patent Applications No. 10-2014-0078942 filed on Jun. 26, 2014 with the Korean Intellectual Property Office, the disclosure of which is incorporated herein by reference in its entirety.

TECHNICAL FIELD

The present invention relates to a thermoplastic elastomer composition having advanced vibration isolation and thermal resistance, and a molded article manufactured therefrom.

BACKGROUND OF ART

A thermoplastic elastomer that is also referred to as thermoplastic rubber is a mixture of copolymers or polymers simultaneously having thermoplasticity and elasticity. Compared to general elastomers having a thermosetting property, a thermoplastic elastomer can be relatively easily processed, and thus enables preparation of molded articles through extrusion molding, foaming, and the like.

For the preparation of the thermoplastic elastomer, a composition including ethylene propylene diene monomer rubber (EPDM) components and olefinic resin is generally used. However, in general, the thermoplastic elastomer has poor thermal resistance, and thus if exposed to a high temperature environment for a long time, the mechanical properties may be rapidly degraded.

Further, since general thermoplastic elastomers exhibit insufficient vibration insulation in the vibration frequency area that a human can feel, compensation of mechanical properties such as a storage modulus, particularly, is required.

In addition, with a recent tendency of industrial development, there has been a growing interest in the advancement of sensible properties such as touch and smell, as well as mechanical or chemical properties of resin molded articles, and according to this tendency, various kinds of thermoplastic elastomers have been suggested. However, since thermoplastic elastomers suggested so far do not have a balance of the above-explained properties, there is still a demand for supplement thereof.

DETAILED DESCRIPTION OF THE INVENTION

Technical Problem

It is an object of the present invention to provide a thermoplastic elastomer composition having advanced vibration insulation and thermal resistance.

It is another object of the present invention to provide a molded article manufactured using the thermoplastic elastomer composition.

Technical Solution

According to the present invention, a thermoplastic elastomer composition including:
10 to 85 wt % of olefinic rubber;
5 to 50 wt % of one or more styrene-based block copolymers having a melt flow index of 0.8 to 1.2 g/10 min (200° C., 2.16 kg), and selected from the group consisting of a styrene-butylene-styrene block copolymer and a styrene-ethylene/butylene-styrene block copolymer;
0.1 to 50 wt % of an oil;
1 to 50 wt % of high melt strength polypropylene having a heat deflection temperature of 120 to 135° C. under a load of 4.6 kgf/cm$^2$ and elongation viscosity of $1.0 \times 10^5$ to $1.0 \times 10^7$ poise;
0.1 to 15 wt % of an inorganic filler; and
0.1 to 10 wt % of a cross-linking agent,
is provided.

The thermoplastic elastomer composition may have a storage modulus of 16 MPa or less at a temperature of 20° C. and under a vibration frequency of 100 MHz.

The thermoplastic elastomer composition may have a minimum storage modulus of 7.5 MPa or less and a maximum storage modulus of 37 MPa or less at a temperature of 20° C. and in the vibration frequency range of 0 to 100 MHz.

The thermoplastic elastomer composition may have a loss modulus of 30 MPa or less at a temperature of 20° C. and under a vibration frequency of 100 MHz.

The thermoplastic elastomer composition may have elongation of 630% or more according to ISO 37.

Further, according to the present invention, the olefinic rubber included in the thermoplastic elastomer composition may be one or more selected from the group consisting of butadiene rubber, nitrile-butadiene rubber, isobutylene-isoprene rubber, and ethylene-propylene-diene monomer rubber.

In addition, according to the present invention, the olefinic rubber may be ethylene propylene diene monomer rubber containing 4.5 to 10 wt % of ethylidene norbornene and 50 to 80 wt % of ethylene and having Mooney viscosity (ML1+8, 125° C.) of 45 to 70.

According to the present invention, the styrene-based block copolymer may be a styrene-ethylene/butylene-styrene block copolymer containing 28 to 35 wt % of styrene blocks and having a weight average molecular weight of 50,000 to 150,000.

According to the present invention, the oil may be paraffin oil with a kinematic viscosity of 90 to 180 cSt at 40° C.

According to the present invention, the high melt strength polypropylene may have a weight average molecular weight of 200,000 to 500,000.

According to the present invention, the inorganic filler may have a number average particle diameter of 1 to 30 μm, and may include kaolin, talc, clay, or a mixture thereof.

Meanwhile, according to the present invention, a molded article manufactured using the above thermoplastic elastomer composition is provided.

Hereinafter, a thermoplastic elastomer composition and a molded article manufactured therefrom according to the embodiments of the present invention will be described.

First, technical terms in the present specification are only for mentioning specific embodiments, and they are not intended to restrict the present invention unless there is a particular mention about them. Singular expressions used herein may include plural expressions unless they are differently expressed contextually. The meaning of the term "comprise" or "include" used in the specification embodies specific characteristics, areas, essences, steps, actions, elements, and/or components, and does not exclude existence or addition of other specific characteristics, areas, essences, steps, actions, components, elements, and/or groups.

I. A Thermoplastic Elastomer Composition

According to one embodiment of the invention, a thermoplastic elastomer composition including:

10 to 85 wt % of olefinic rubber;

5 to 50 wt % of one or more styrene-based block copolymer having a melt flow index of 0.8 to 1.2 g/10 min (200° C., 2.16 kg), and selected from the group consisting of a styrene-butylene-styrene block copolymer and a styrene-ethylene/butylenes-styrene block copolymer;

0.1 to 50 wt % of an oil;

1 to 50 wt % of high melt strength polypropylene having a heat deflection temperature of 120 to 135° C. under a load of 4.6 kgf/cm$^2$ and elongation viscosity of $1.0 \times 10^5$ to $1.0 \times 10^7$ poise;

0.1 to 15 wt % of an inorganic filler; and 0.1 to 10 wt % of a cross-linking agent, is provided.

As a result of repeated studies of the present inventors, is was confirmed that a composition including a styrene-based block copolymer satisfying specific properties and a high melt strength propylene together with olefinic rubber at a specific content ratio enables provision of a molded article that not only has excellent mechanical properties but also has particularly advanced vibration insulation and thermal resistance.

That is, a molded article manufactured using the composition may exhibit excellent vibration insulation in the vibration frequency area (for example, 100 MHz) that a human can feel, and may maintain excellent mechanical properties even if exposed to a high temperature environment for a long time.

Hereinafter, the components that can be included in the thermoplastic elastomer composition and the properties of the composition will be explained.

Olefinic Rubber

The olefinic rubber may be a widely used olefinic rubber known in the technical field to which the present invention pertains. Preferably, the olefinic rubber may be one or more rubbers selected from the group consisting of butadiene rubber (BR), nitrile-butadiene rubber (NR), isobutylene-isoprene rubber (IIR), and ethylene-propylene-diene rubber (EPDM). Among the examples, it may be advantageous in terms of moldability and uniformity for the olefinic rubber to be EPDM.

The EPDM is a kind of terpolymer derived from at least two kinds of mono-olefin monomers (C2-10, preferably C2-4), and at least one kind of poly-unsaturated olefin (C5-20).

The mono-olefin monomers may be $CH_2=CH-R$ (R is H or a C1-12 alkyl group), and preferably ethylene or propylene. Preferably, the repeat units of the at least two kinds of mono-olefin monomers may be included in the content of 90 to 99.6 wt %, based on the total weight of the EPDM.

The poly-unsaturated olefin may be in a straight chained, branched, cyclic, bicyclic, or bridged ring form, and the like, and preferably, it may be a non-conjugated diene. Such poly-unsaturated olefin may be included in the content of 0.4 to 10 wt % based on the total weight of the EPDM.

Further, it may be advantageous in terms of moldability and uniformity for the EPDM to include 4.5 wt % or more, preferably 4.5 to 10 wt %, and more preferably 4.5 to 9 wt % of ethylidene norbornene (ENB), and 50 wt % or more, preferably 50 to 80 wt %, and more preferably 60 to 75 wt % of ethylene, and to have Mooney viscosity (ML1+8, 125° C.) of 45 or more, preferably 45 to 70, and more preferably 45 to 60.

Such olefinic rubber may be included in the content of 10 to 85 wt %, 15 to 80 wt %, 25 to 80 wt %, or 30 to 60 wt %, based on the total weight of the composition.

That is, in order to exhibit appropriate elasticity required for a thermoplastic elastomer composition, it is preferable for the olefinic rubber to be included in the content of 10 wt % or more, based on the total weight of the composition. However, if the olefinic rubber is excessively added, flowability and moldability may decrease due to a rapid increase in viscosity. Thus, it is preferable for the olefinic rubber to be included in the content of 85 wt % or less, based on the total weight of the composition.

Styrene-Based Block Copolymer

The styrene-based block copolymer is a block copolymer including at least one styrene-based repeat unit.

As the styrene-based block copolymer is included together with the above-explained olefinic rubber at a specific content ratio in the thermoplastic elastomer composition according to the embodiment of the invention, excellent vibration insulation may be exhibited, particularly in the vibration frequency area that a human can feel. Particularly, such a property advancement effect may be better obtained by applying a styrene-based block copolymer having a specific range of melt flow index (MFI).

As the styrene-based block copolymer, one or more block copolymers selected from the group consisting of a styrene-butylene-styrene (SBS) block copolymer and a styrene-ethylene/butylenes-styrene (SEBS) block copolymer may be used. Among them, the SEBS block copolymer may be more preferably used because it exhibits excellent elongation without a chemical cross-link, does not give off the unique smell of rubber, and has excellent color matching and feel.

The content of the styrene-based block copolymer may be determined in the range that can exhibit advanced vibration insulation while maintaining the properties exhibited by compounding with the above-explained olefinic rubber, particularly appropriate elasticity.

For example, the styrene-based block copolymer may be included in the content of 5 to 50 wt %, 10 to 35 wt5, or 15 to 30 wt % based on the total weight of the composition.

That is, in order to sufficiently exhibit a property advancing effect by the compounding of the olefinic rubber and the styrene-based block copolymer, it is preferable for the styrene-based block copolymer to be included in the content of 5 wt % or more, based on the total weight of the composition. However, if the styrene-based block copolymer is excessively added, the thermal resistance of the composition and the molded article may decrease. Thus, it is preferable for the styrene-based block copolymer to be included in the content of 50 wt % or less, based on the total weight of the composition.

Particularly, it is preferable for the styrene-based block copolymer to have a melt flow index (MFI) of 0.8 to 1.2 g/10 min, 0.8 to 1.0 g/10 min, or 1.0 to 1.2 g/10 min (200° C., 2.16 kg).

In order to exhibit advanced vibration insulation while maintaining elasticity and elongation by the compound with olefinic rubber, it is preferable for the styrene-based block copolymer to have an MFI of 0.8 g/10 min (200° C., 2.16 kg) or more.

However, if the MFI of the styrene-based block copolymer is too high, a storage modulus may increase and a loss modulus may decrease, and thus it may become difficult to secure vibration insulation. Further, if the MFI of the styrene-based block copolymer is too high, the moldability of the composition may decrease.

For example, since a styrene-based block copolymer having excessively high MFI has low melt tension, a resin may hang down at a die part of an extruder at the time of extrusion molding, and distribution may not be smoothly achieved, and thus the appearance may not be uniform.

Particularly, since in the field of automobile materials in which vibration insulation is important, extrusion blown molding is mainly applied, and the MFI of the styrene-based block copolymer may act as an important factor. Thus, it is preferable for the styrene-based block copolymer to have an MFI of 1.2 g/10 min (200° C., 2.16 kg) or less.

In case the SEBS block copolymer is used as the styrene-based block copolymer, it may be advantageous in terms of the manifestation of the above-explained properties for the SEBS block copolymer to contain at least 28 wt %, 28 to 35 wt %, 28 to 33 wt %, or 29 to 32 wt % of styrene blocks.

For the same reason, it is preferable for the SEBS block copolymer to have a weight average molecular weight of 50,000 to 150,000, 80,000 to 120,000, or 100,000 to 120,000. Further, it may be preferable for the SEBS block copolymer to have a number average molecular weight of 50,000 to 150,000, 80,000 to 120,000, or 100,000 to 120,000. Furthermore, it is preferable for the styrene blocks included in the SBE block copolymer to have a number average molecular weight of 9000 to 12,000, or 10,000 to 11,000, and for the ethylene-butylene blocks to have a number average molecular weight of 45,000 to 55,000, or 50,000 to 54,000.

Oil

Meanwhile, as the viscosities of the olefinic rubber and the styrene-based block copolymer increase, rubber properties such as elasticity are improved, while flowability decreases, and thus there may be a difficulty in the preparation process of elastomer.

That is, if the composition includes only the olefinic rubber and the styrene-based block copolymer, the viscosity is high, and thus it is required to secure flowability and moldability. Thus, in the thermoplastic elastomer composition according to one embodiment of the invention, an oil having compatibility with the olefinic rubber and the styrene-based block copolymer is included.

As the oil, paraffin oil commonly used as process oil may be used. However, in order to secure flowability and moldability while maintaining the properties of the composition required in the present invention, it may be preferable for the paraffin oil to have a kinematic viscosity of 90 cSt or more, 90 to 180 cSt, or 100 to 150 cSt at 40° C.

The oil may be included in a content suitable for the preparation of the composition and manufacture of a molded article, and preferably, it may be included in the content of 0.1 to 50 wt %, 1 to 50 wt %, 5 to 40 wt %, or 10 to 25 wt %, based on the total weight of the composition.

If the oil is excessively included, unabsorbed oil may be eluted outside of the molded article or the mechanical properties of the molded article may be decreased. Thus, it is preferable for the content of oil to be controlled in the above-explained range. Further, in case oil-containing commercial products are used as the olefinic rubber and the styrene-based block copolymer, it is preferable for the content of oil included in the composition to be controlled to the above-explained range considering the content of oil included in the commercial products.

High Melt Strength Polypropylene

Meanwhile, the thermoplastic elastomer composition according to one embodiment includes high melt strength polypropylene (hereinafter referred to as 'HMS-PP').

The HMS-PP is a kind of high melt strength polyolefin or long-chain branched polyolefin, gives thermoplasticity to the composition of one embodiment, and furthermore may give excellent moldability, thermal resistance, tensile strength, tear strength, and the like.

The HMS-PP compensates the disadvantage of general polypropylene that has low melt strength due to the structure of a long chain, and it may be prepared by increasing the molecular weight, widening the molecular weight distribution (MWD), increasing the content of branched polymer chains, and the like. For example, the HMS-PP may be obtained by introducing long chain branches into the backbone of polypropylene to increase melt strength, and for this, a method of cutting the backbone of polypropylene and then introducing branches through secondary re-arrangement may be applied.

Such HMS-PP has higher melt strength compared to common polypropylene, and is included in the thermoplastic elastomer composition of one embodiment to enable providing a molded article having advanced tensile strength, flexural strength, flexural modulus, thermal resistance, and the like. Particularly, in the case of polypropylene, elongation viscosity increases in part with the passage of time and then is saturated, while in the case of HMS-PP having a long chain structure, elongation viscosity may increase even at the saturation point of elongation viscosity of common polypropylene.

Thus, a thermoplastic elastomer composition including HMS-PP with such property and the above-explained olefinic rubber and styrene-based block copolymer at a specific content ratio may exhibit excellent mechanical properties (particularly vibration insulation) and advanced thermal resistance, and thus may maintain excellent properties even if exposed to a high temperature environment for a long time.

According to one embodiment, in order to fulfill the properties required in the present invention, it may be advantageous for the HMS-PP to have melt strength of 0.12 to 0.9 N, and it may be advantageous for the HMS-PP to have a melt flow index of 2.0 to 3.0 g/10 min, or 2.3 to 2.5 g/10 min. Further, it may be advantageous for the HMS-PP to have a density of 0.890 to 0.910 g/cm$^3$; tensile strength of 350 to 450 kgf/cm$^2$; elongation at break of 50 to 70%; a flexural modulus of 18,000 to 25,000 kgf/cm$^2$, or 19,000 to 23,000 kgf/cm$^2$; and impact strength of 5 to 15 kgf cm/cm, or 10 to 15 kgf cm/cm.

Particularly, according to one embodiment, in order to fulfill the properties required in the present invention, it may be preferable for the HMS-PP to have a heat deflection temperature of 120° C. or more, 120 to 135° C., 125 to 135° C., or 125 to 130° C. under a load of 4.6 kgf/cm$^2$.

Furthermore, it may be advantageous in terms of advancement of thermal resistance for the HMS-PP to have elongation viscosity of $1.0 \times 10^5$ to $1.0 \times 10^7$ poise, or $1.0 \times 10^6$ to $1.0 \times 10^7$ poise.

It may also be more advantageous in terms of securing mechanical properties for the HMS-PP to have a weight average molecular weight of 200,000 to 500,000, 250,000 to 450,000, 300,000 to 400,000, or 300,000 to 350,000.

Such HMS-PP may be included in the content of 1 to 50 wt %, 5 to 50 wt %, 5 to 40 wt %, or 10 to 35 wt %, based on the total weight of the composition.

That is, in order to exhibit required properties in the present invention (particularly advancement of vibration insulation and thermal resistance), it is preferable for the HMS-PP to be included in the content of 1 wt % or more based on the total weight of the composition. However, if the HMS-PP is excessively included, appropriate elasticity and mechanical properties may not be secured. Thus, it is preferable for the HMS-PP to be included in the content of 50 wt % or less, based on the total weight of the composition.

Inorganic Filler

The thermoplastic elastomer composition according to one embodiment includes an inorganic filler.

The inorganic filler may be added to reinforce the thermal resistance and the mechanical properties of a molded article, and those commonly used in the technical field to which the present invention pertains may be used without specific limitations.

As non-limiting examples, as the inorganic filler, talc, clay, calcium carbonate, wollastonite, calcium sulfate, magnesium oxide, calcium stearate, mica, calcium silicate, carbon black, and the like may be used, and among them, kaolin, talc, clay, and the like may be more suitably used.

In order to secure the dispersibility of the inorganic filler, an organic modified inorganic filler may be used if necessary. Since the organic modified inorganic filler may exhibit the equivalent effect to common fillers even if added in a relatively small amount, it may be more suitably used to decrease the specific gravity of the composition.

The shape of the inorganic filler is not specifically limited. However, considering the dispersibility of the inorganic filler and workability at the time of extrusion molding of the composition, it may be preferable for the inorganic filler to have a number average particle diameter of 1 to 30 μm, 1 to 20 μm, or 5 to 20 μm.

Further, considering the property advancing effect resulting from the addition of the inorganic filler, as well as specific gravity and moldability of the composition, and the like, the inorganic filler may be included in the content of 0.1 to 15 wt %, 1 to 15 wt %, or 5 to 15 wt %, based on the total weight of the composition.

Cross-Linking Agent

In the preparation of the thermoplastic elastomer, a cross-linking agent is added to cross-link the rubber parts, which are soft segments, and it may dynamically cross-link using an extruder and the like, to exhibit rubber-like viscosity and elasticity.

The cross-linking agent that can be used may be selected from those commonly used in the technical field to which the present invention pertains, and preferably, a phenol resin cross-linking agent, a peroxide cross-linking agent, a silane cross-linking agent, and the like may be used. As non-limiting examples, the cross-linking agent may be benzoyl peroxide, dicumyl peroxide, isobutyryl peroxide, 2,2-bis(t-butylperoxy)butane, and the like.

The cross-linking agent may be included in the content of 0.1 to 10 wt %, 1 to 10 wt %, or 1 to 5 wt %, based on the total weight of the composition.

That is, in order to prevent insufficient cross-linking and the resulting degradation of the properties of the molded article, it is preferable for the cross-linking agent to be included in the content of 0.1 wt % or more, based on the total weight of the composition. If the cross-linking agent is excessively added, imperfections such as bumps, gel, or sunspots may be observed on the surface of the molded article, the color of the article may be influenced, and the moldability may be decreased by a rapid cross-linking reaction. Thus, it is preferable for the cross-linking agent to be included in the content of 10 wt % or less, based on the total weight of the composition.

If necessary, a co-cross-linking agent may be further used. As the co-cross-linking agent, compounds such as a metal oxide, a metal halide, and the like may be used, and specifically, ZnO, $SnCl_2$, steric acid, zinc stearate, and the like may be illustrated. The co-cross-linking agent may be included in the content of 0.05 to 5 wt %, based on the total weight of the composition, for the same reason as the cross-linking agent.

Reaction Terminating Agent

The thermoplastic elastomer composition according to one embodiment may further include a reaction terminating agent.

The reaction terminating agent may be added to appropriately terminate a cross-linking reaction at the time of molding of a composition, thus preventing property degradation. As the reaction terminating agent, common phenol-based oxidation stabilizers, phosphorus-based oxidation stabilizers, phosphate-based thermal stabilizers, and the like may be used.

Considering the effects resulting from the addition of the reaction terminating agent and blooming of the surface of the molded article that may be generated when the reaction terminating agent is excessively added, the reaction terminating agent may be included in the content of 0.05 to 5 wt %, based on the total weight of the composition.

Properties

The thermoplastic elastomer composition including the above-explained components may exhibit advanced vibration insulation, particularly in the vibration frequency area that a human can feel (for example, 100 MHz), and simultaneously maintain excellent mechanical properties even if exposed to a high temperature environment for a long time, thus exhibiting excellent thermal resistance.

According to one embodiment, the vibration insulation may be assessed through the properties such as a storage modulus and a loss modulus. For example, if the storage modulus is relative high, rebound elasticity is high, which means low absorption of the impact applied from the outside.

Further, if the loss modulus is relatively high, rebound elasticity is low, which means high absorption of the impact. Thus, if a composition has a relatively low storage modulus or a high loss modulus, it can be interpreted as having excellent vibration insulation.

Considering the above, it is preferable in terms of exhibition of vibration insulation for the thermoplastic elastomer composition to have a storage modulus of 16 MPa or less, 5 to 16 MPa, 9 to 15.5 MPa, or 9.5 to 15.5 MPa at a temperature of 20° C. and under a vibration frequency of 100 MHz.

It is also preferable in terms of exhibition of vibration insulation for the thermoplastic elastomer composition to have a minimum storage modulus of 7.5 MPa or less, 7 MPa or less, or 2 to 7 MPa, and to have a maximum storage modulus of 37 MPa or less, 30 to 37 MPa, or 32 to 37 MPa at a temperature of 20° C. and in the vibration frequency range of 0 to 100 MHz.

In addition, it is preferable in terms of exhibition of vibration insulation for the thermoplastic elastomer composition to have a loss modulus of 30 MPa or more, or 30 to 35 MPa at a temperature of 20° C. and under a vibration frequency of 100 MHz.

The thermoplastic elastomer composition may not only have excellent vibration insulation but may also fulfill excellent mechanical properties. For example, the thermoplastic elastomer composition may exhibit Shore A hardness of 50 or more, 50 to 70, or 55 to 65. Particularly, the composition may have elongation of 630% or more, or 630 to 660% according to ISO 37.

The thermoplastic elastomer composition may exhibit excellent thermal resistance that can be maintained without significant change of the above properties even if exposed to a high temperature environment for a long time.

II. Molded Article

According to another embodiment of the present invention, a molded article manufactured using the above-explained thermoplastic elastomer composition of one embodiment is provided.

Since the molded article is manufactured using the above-explained thermoplastic elastomer composition, it may not only exhibit advanced vibration insulation in the vibration frequency area that a human can feel, but may also maintain excellent mechanical properties even if exposed to a high temperature environment for a long time, thus exhibiting advanced thermal resistance.

Such a molded article may be obtained by common methods such as extrusion molding and the like, except that it is manufactured using the above-explained thermoplastic elastomer composition.

The molded article may be applied in various fields requiring the above-explained properties. For example, the molded article may be appropriately used in various fields such as parts for an automobile, interior and exterior materials for an automobile, interior and exterior materials for a building, various daily supplies and medical supplies, and the like.

Advantageous Effects

The thermoplastic elastomer composition according to the present invention has advanced vibration insulation and thermal resistance. Thus, the thermoplastic elastomer composition may exhibit excellent vibration insulation in the vibration frequency area that a human can feel, and maintain excellent mechanical properties even if exposed to a high temperature environment for a long time.

A molded article manufactured using the thermoplastic elastomer composition may be appropriately used in various fields such as for various daily supplies, medical supplies, parts for an automobile, interior and exterior materials for an automobile, interior and exterior materials for a building, and the like.

DETAILED DESCRIPTION OF THE EMBODIMENTS

Hereinafter, preferable examples will be presented for the complete understanding of the present invention. However, these examples are only to illustrate the present invention, and the scope of the invention is not limited thereto.

The thermoplastic elastomer compositions according to examples and comparative examples were respectively obtained using the components shown in the following Table 1. Herein, a twin screw extruder equipped with an internal mixer and an extruder and having a ratio of length (L)/outer diameter (D) is 52 was used, and the reaction temperature was controlled to 160 to 220° C.

TABLE 1

| | (wt %) | Example 1 | Example 2 | Comparative Example 1 | Comparative Example 2 | Comparative Example 3 | Comparative Example 4 | Comparative Example 5 |
|---|---|---|---|---|---|---|---|---|
| | EPDM | 30 | 20 | 50 | 40 | — | 20 | 30 |
| | SEBS | 15 | 20 | — | — | 30 | 20 | 15 |
| | Paraffin oil | 15 | 20 | 10 | 20 | 30 | 20 | 15 |
| PP | HMS | 20 | 20 | — | — | — | — | — |
| | Homo | — | — | 20 | 20 | 20 | 20 | — |
| | Block | — | — | — | — | — | — | 20 |
| | Cross-linking agent | 3.5 | 3.5 | 3.5 | 3.5 | 3.5 | 3.5 | 3.5 |
| | Talc | 13 | 13 | 13 | 13 | 13 | 13 | 13 |
| | Reaction terminating agent | 3.5 | 3.5 | 3.5 | 3.5 | 3.5 | 3.5 | 3.5 |

Example 1

EPDM (manufacturing company: Kumho Polychem, product name: KEP-960NF, ENB content: 5.7 wt %, ethylene content: 70 wt %, Mooney viscosity (ML1+8, 125° C.): 49) was added such that the content of pure EPDM became 30 wt % based on the total composition.

Specifically, the EPDM product (KEP-960NF) is a product with a paraffin oil content of 50 PHR (Parts per Hundred Resin), and is added such that the content of pure EPDM became 30 wt % based on the total composition; however, considering the content of paraffin oil basically included in the product, the content of paraffin oil included in the total composition was controlled to 15 wt %. As the additionally added paraffin oil, a product manufactured by Michang Oil Industry (product name: W-1900H, kinematic viscosity (40° C.): 137 cSt) was used.

In addition, 15 wt % of SEBS block copolymer (styrene block content of about 29 wt %; melt flow index of about 1.0 g/10 min (200° C., 2.16 kg); weight average molecular weight of about 112,368 g/mol; number average molecular weight of about 100,943 g/mol; styrene block=number average molecular weight of about 10,300 g/mol; ethylene-butylene block=number average molecular weight of about 53,300 g/mol; viscosity at 25° C. in toluene of about 50 Pa·s; manufactured by Kraton Company [Kraton G 1651]);

20 wt % of HMS-PP (manufactured by Lotte Chemical Corporation [SMS-514F]; thermal deflection temperature of about 130° C. (4.6 kgf/cm$^2$); elongation viscosity of about 1.0×10$^6$ poise; weight average molecular weight of about 330,000; melt flow index of about 2.4 g/10 min; density of about 0.905 g/cm$^3$; tensile strength of about 400 kgf/cm$^2$; elongation at break of about 60%; flexural modulus of about 19,000 kgf/cm$^2$; impact strength of about 10 kgf cm/cm);

3.5 wt % of a cross-linking agent (dimethylol phenolic resin);

13 wt % of talc (number average particle diameter about 4.0 μm, Manufacturer: KCM, product name: KCM-6300); and 3.5 wt % of a reaction terminating agent (phenol-based primary, secondary complex oxidation stabilizer, product name: TCMB-2300)
were used.

Example 2

A thermoplastic elastomer composition was obtained by the same method as Example 1, except that the contents of EPDM, SEBS, and paraffin oil were controlled as shown in Table 1.

Comparative Example 1 and Comparative Example 2

Thermoplastic elastomer compositions were obtained by the same method as Example 1, except that the content of EPDM was controlled as shown in Table 1, SEBS and HMS-PP were not added, and a polypropylene homopolymer (manufactured by Lotte Chemical Corporation [Y-130]; thermal deflection temperature of about 116° C. (4.6 kgf/cm$^2$); melt flow index of about 4.0 g/10 min; density of about 0.90 g/cm$^3$; tensile strength of about 350 kgf/cm$^2$; flexural modulus of about 16,000 kgf/cm$^2$; impact strength of about 4.0 kgf cm/cm) was used instead of HMS-PP.

Comparative Example 3

A thermoplastic elastomer composition was obtained by the same method as Example 1, except that the contents of SEBS and paraffin oil were controlled as shown in Table 1, EPDM and HMS-PP were not added, and a polypropylene homopolymer (manufactured by Lotte Chemical Corporation [Y-130]; thermal deflection temperature of about 116° C. (4.6 kgf/cm$^2$); melt flow index of about 4.0 g/10 min; density of about 0.90 g/cm$^3$; tensile strength of about 350 kgf/cm$^2$; flexural modulus of about 16,000 kgf/cm$^2$; impact strength of about 4.0 kgf cm/cm) was used instead of HMS-PP.

Comparative Example 4 and Comparative Example 5

Thermoplastic elastomer compositions were obtained by the same method as Example 1, except that the contents of EPDM, SEBS, and paraffin oil were controlled as shown in Table 1, and a polypropylene homopolymer (manufactured by Lotte Chemical Corporation [Y-130]; thermal deflection temperature of about 116° C. (4.6 kgf/cm$^2$); melt flow index of about 4.0 g/10 min; density of about 0.90 g/cm$^3$; tensile strength of about 350 kgf/cm$^2$; flexural modulus of about 16,000 kgf/cm$^2$; impact strength of about 4.0 kgf cm/cm) was used instead of HMS-PP.

Example 3

A thermoplastic elastomer composition was obtained by the same method as Example 1, except that SEBS having a melt flow index of 0.8 g/10 min (200° C., 2.16 kg) was used.

Example 4

A thermoplastic elastomer composition was obtained by the same method as Example 1, except that SEBS having a melt flow index of 1.2 g/10 min (200° C., 2.16 kg) was used.

Comparative Example 6

A thermoplastic elastomer composition was obtained by the same method as Example 1, except that SEBS having a melt flow index of 0.6 g/10 min (200° C., 2.16 kg) was used.

Comparative Example 7

A thermoplastic elastomer composition was obtained by the same method as Example 1, except that SEBS having a melt flow index of 1.5 g/10 min (200° C., 2.16 kg) was used.

Experimental Example

The properties of the thermoplastic elastomer compositions obtained in the examples and comparative examples were measured by the following methods, and the results are shown in the following Tables 2 to 5.

1) Density: The density (g/cm$^3$) of a specimen with a width of 10 mm, a length of 10 mm, and a thickness of 2.0 mm was measured according to the method of ISO 1183.

2) Hardness (Shore A): Hardness was measured using an Analogue Shore Hardness Tester according to the method of ISO 868.

3) Melt Index: A melt index was measured according to the method of ISO 1133 at 230° C. and under a load of 10 kg.

4) Tensile strength, Tear strength, and Elongation: Tensile strength, tear strength, and elongation were measured using a Universal materials testing machine according to the method of ISO 37.

5) Elasticity: A storage modulus and a loss modulus were measured using dynamic mechanical analysis (DMA) under a vibration frequency of 100 MHz. For the storage modulus, the maximum value and the minimum value in the vibration frequency area of 0 to 100 MHz were measured together.

6) Thermal resistance: After the thermoplastic elastomer compositions were respectively stored at about 125° C. for 168 h, the above-explained tensile strength, tear strength, and elongation were measured.

TABLE 2

| (20° C.) | | Example 1 | Example 2 | Comparative Example 1 | Comparative Example 2 | Comparative Example 3 | Comparative Example 4 | Comparative Example 5 |
|---|---|---|---|---|---|---|---|---|
| Density | | 0.9786 | 0.9683 | 0.9831 | 0.9802 | 0.9617 | 0.9688 | 0.9808 |
| Hardness (Shore A) | | 64 | 65 | 63 | 65 | 64 | 66 | 64 |
| MI (g/10 min) | | 24 | 40 | 20 | 32 | 41 | 35 | 26 |
| Tensile strength (kgf/cm$^2$) | | 120 | 100 | 120 | 115 | 115 | 110 | 100 |
| Tear strength (kgf/cm$^2$) | | 58 | 53 | 56 | 58 | 57 | 56 | 52 |
| elongation (%) | | 650 | 640 | 660 | 650 | 660 | 650 | 670 |
| Storage modulus (MPa) | @ 100 MHz | 11.21 | 15.1 | 19.76 | 16.32 | 11.21 | 15.68 | 13.75 |
| | Maximum | 34.52 | 33.65 | 48.8 | 45.2 | 42.7 | 40.8 | 34.8 |
| | Minimum | 4.51 | 4.32 | 18.7 | 16.4 | 13.8 | 14.4 | 7.95 |
| Loss modulus (MPa) | | 31.71 | 32.0 | 33.28 | 32.16 | 31.71 | 32.03 | 31.84 |

TABLE 3

| (125° C., 168 h) | Example 1 | Example 2 | Comparative Example 1 | Comparative Example 2 | Comparative Example 3 | Comparative Example 4 | Comparative Example 5 |
|---|---|---|---|---|---|---|---|
| Tensile strength (kgf/cm²) | 120 | 110 | 120 | 115 | 110 | 100 | 100 |
| Tear strength (kgf/cm²) | 56 | 55 | 55 | 57 | 54 | 52 | 55 |
| Elongation (%) | 640 | 550 | 630 | 625 | 600 | 590 | 650 |

TABLE 4

| (20° C.) | | Example 1 | Example 3 | Example 4 | Comparative Example 6 | Comparative Example 7 |
|---|---|---|---|---|---|---|
| Density | | 0.9786 | 0.9822 | 0.9756 | 0.9976 | 0.9572 |
| Hardness (Shore A) | | 64 | 64 | 64 | 64 | 64 |
| MI (g/10 min) | | 24 | 20 | 30 | 17 | 55 |
| Tensile strength (kgf/cm²) | | 120 | 125 | 118 | 127 | 100 |
| Tear strength (kgf/cm²) | | 58 | 60 | 55 | 62 | 48 |
| Elongation (%) | | 650 | 630 | 660 | 615 | 760 |
| Storage modulus (MPa) | @ 100 MHz | 9.88 | 11.21 | 13.67 | 7.26 | 15.92 |
| | Maximum | 32.11 | 34.52 | 36.53 | 30.65 | 38.96 |
| | Minimum | 2.33 | 4.51 | 6.77 | 1.78 | 8.69 |
| Loss modulus (MPa) | | 31.71 | 33.89 | 30.22 | 35.97 | 27.68 |

TABLE 5

| (125° C., 168 h) | Example 1 | Example 3 | Example 4 | Comparative Example 6 | Comparative Example 7 |
|---|---|---|---|---|---|
| Tensile strength (kgf/cm²) | 120 | 128 | 119 | 134 | 100 |
| Tear strength (kgf/cm²) | 56 | 63 | 56 | 64 | 49 |
| Elongation (%) | 640 | 625 | 630 | 605 | 700 |

Referring to the Tables 2 to 5, it was confirmed that the thermoplastic elastomers according to the examples exhibit mechanical properties that are equivalent to or much better than those of the elastomers of the comparative examples under room temperature conditions, and simultaneously, have advanced vibration insulation. It was also confirmed that with regard to the properties after aging at a high temperature, the thermoplastic elastomers according to the examples maintain excellent initial properties without significant changes, thus having excellent thermal resistance.

The invention claimed is:

1. A thermoplastic elastomer composition comprising:
   10 to 85 wt % of olefinic rubber;
   5 to 50 wt % of one or more styrene-based block copolymer having a melt flow index of 0.8 to 1.2 g/10 min at 200° C. and 2.16 kg load;
   0.1 to 50 wt % of an oil;
   1 to 50 wt % of high melt strength polypropylene having a thermal deflection temperature of 120 to 135° C. under a load of 4.6 kgf/cm² and elongation viscosity of $1.0 \times 10^5$ to $1.0 \times 10^7$ poise;
   0.1 to 15 wt % of an inorganic filler; and
   0.1 to 10 wt % of a cross-linking agent,
   wherein all weight percentages are based on the total weight of the composition,
   wherein the styrene-based block copolymer is a styrene-ethylene/butylene-styrene block copolymer containing 28 to 35 wt % of styrene blocks and having a weight average molecular weight of 50,000 to 150,000,
   wherein the composition has a minimum storage modulus of 7.5 MPa or less and a maximum storage modulus of 37 MPa or less when measured using dynamic mechanical analysis at a temperature of 20° C. and in the vibration frequency range of 0 to 100 MHz.

2. The thermoplastic elastomer composition according to claim 1, wherein the composition has a storage modulus of 16 MPa or less at a temperature of 20° C. and under a vibration frequency of 100 MHz.

3. The thermoplastic elastomer composition according to claim 1, wherein the composition has a loss modulus of 30 MPa or less at a temperature of 20° C. and under a vibration frequency of 100 MHz.

4. The thermoplastic elastomer composition according to claim 1, wherein the composition has elongation of 630% or more according to ISO 37.

5. The thermoplastic elastomer composition according to claim 1, wherein the olefinic rubber is one or more selected from the group consisting of butadiene rubber, nitrile-butadiene rubber, isobutylene-isoprene rubber, and ethylene-propylene-diene monomer rubber.

6. The thermoplastic elastomer composition according to claim 1, wherein the olefinic rubber is ethylene propylene diene monomer rubber containing 4.5 to 10 wt % of ethylidene norbornene and 50 to 80 wt % of ethylene and having Mooney viscosity (ML1+8, 125° C.) of 45 to 70.

7. The thermoplastic elastomer composition according to claim 1, wherein the oil is paraffin oil with a kinematic viscosity of 90 to 180 cSt at 40° C.

8. The thermoplastic elastomer composition according to claim 1, wherein the high melt strength polypropylene has a weight average molecular weight of 200,000 to 500,000.

9. The thermoplastic elastomer composition according to claim 1, wherein the inorganic filler has a number average particle diameter of 1 to 30 μm, and includes kaolin, talc, clay, or a mixture thereof.

10. A molded article manufactured using the thermoplastic elastomer composition according to claim 1.

* * * * *